(12) United States Patent
Balachandran et al.

(10) Patent No.: US 7,349,338 B2
(45) Date of Patent: Mar. 25, 2008

(54) SCHEDULER AND METHOD FOR SCHEDULING TRANSMISSIONS IN A COMMUNICATION NETWORK

(75) Inventors: Krishna Balachandran, Morganville, NJ (US); Kenneth C. Budka, Marlboro, NJ (US); Arnab Das, Washington, DC (US); Kameswara Rao Medapalli, Middletown, NJ (US); Minothi Parulekar, Bangalore (IN)

(73) Assignee: Lucent Technologies Inc, Murray Hill, NJ (US)

( * ) Notice: Subject to any disclaimer, the term of this patent is extended or adjusted under 35 U.S.C. 154(b) by 999 days.

(21) Appl. No.: 10/413,382

(22) Filed: Apr. 15, 2003

(65) Prior Publication Data

US 2004/0208183 A1    Oct. 21, 2004

(51) Int. Cl.
*H04J 3/16* (2006.01)
*H04B 7/212* (2006.01)

(52) U.S. Cl. .................. 370/232; 370/235.1; 370/329; 370/341

(58) Field of Classification Search ..................... None
See application file for complete search history.

(56) References Cited

U.S. PATENT DOCUMENTS

| 5,752,193 | A | * | 5/1998 | Scholefield et al. ..... 455/452.2 |
| 5,946,324 | A | * | 8/1999 | Mishra et al. ............... 370/468 |
| 5,999,518 | A | | 12/1999 | Nattkemper et al. | |
| 6,546,424 | B1 | * | 4/2003 | Cucchiara ................... 709/226 |
| 6,785,227 | B1 | * | 8/2004 | Lu et al. ...................... 370/229 |
| 6,823,385 | B2 | * | 11/2004 | McKinnon et al. .......... 709/226 |
| 6,917,812 | B2 | * | 7/2005 | Damnjanovic ........... 455/452.2 |
| 6,985,439 | B2 | * | 1/2006 | Hosein ........................ 370/230 |
| 7,031,718 | B2 | * | 4/2006 | Jouppi et al. ................ 455/450 |

| 2002/0061007 | A1 | 5/2002 | Pankaj |
| 2002/0068588 | A1 | 6/2002 | Yoshida et al. |
| 2002/0129143 | A1 | 9/2002 | McKinnon et al. |

(Continued)

FOREIGN PATENT DOCUMENTS

EP            0 817 436 A2        1/1998

(Continued)

OTHER PUBLICATIONS

Xin Liu et al., "A Framework for Opportunistic Scheduling in Wireless Networks", Preprint for Elsevier Science, Jan. 14, 2003, pp. 1-39, XP002299331.

(Continued)

*Primary Examiner*—Chi Pham
*Assistant Examiner*—Soon D. Hyun

(57) ABSTRACT

A scheduler and a method for scheduling transmissions to a plurality of users in a communication network assigns a higher target minimum throughput for receiving a next transmission to a user based on a quality of service (QoS) class of the user. A token count that tracks the user's achieved performance relative to a target minimum throughput Is determined for each user in given timeslot, and a weight is determined for each user based on one or more of the token count and a current rate requested by the user. A user having the highest weight as determined by a weight function is scheduled to be served the next transmission. User priority for scheduling may be downgraded if an average data rate requested by the user is less than the target minimum throughput.

30 Claims, 8 Drawing Sheets

U.S. PATENT DOCUMENTS

| | | |
|---|---|---|
| 2002/0131365 A1 | 9/2002 | Barker et al. |
| 2002/0142789 A1 | 10/2002 | Kuhl et al. |
| 2002/0177447 A1 | 11/2002 | Walton et al. |
| 2002/0183084 A1 | 12/2002 | Wu et al. |
| 2002/0191555 A1 | 12/2002 | Borst et al. |
| 2002/0197999 A1 | 12/2002 | Wu et al. |
| 2003/0013451 A1 | 1/2003 | Walton |

FOREIGN PATENT DOCUMENTS

| | | |
|---|---|---|
| EP | 0 971 512 A2 | 1/2000 |
| EP | 1 154 667 A2 | 11/2001 |
| EP | 1227626 | 7/2002 |
| EP | 1246399 | 10/2002 |
| WO | WO 01/56180 | 8/2001 |
| WO | WO 01/71926 | 9/2001 |
| WO | WO 02/39769 | 5/2002 |
| WO | WO 01/76098 | 10/2002 |

OTHER PUBLICATIONS

Foreign Search Report dated Oct. 14, 2004.

European Search Report (dated Feb. 14, 2006) corresponding to EP 05024801.2.

European Search Report (dated Feb. 14, 2006) corresponding to EP 05024802.0.

European Search Report (dated Feb. 14, 2006) corresponding to EP 05024803.8.

European Search Report (dated Aug. 30, 2007) for counterpart European Patent Application No. 07009956.9-1249 is provided for the purposes of certification under 37 C.F.R. §§ 1.97(e) and 1.704(d).

* cited by examiner

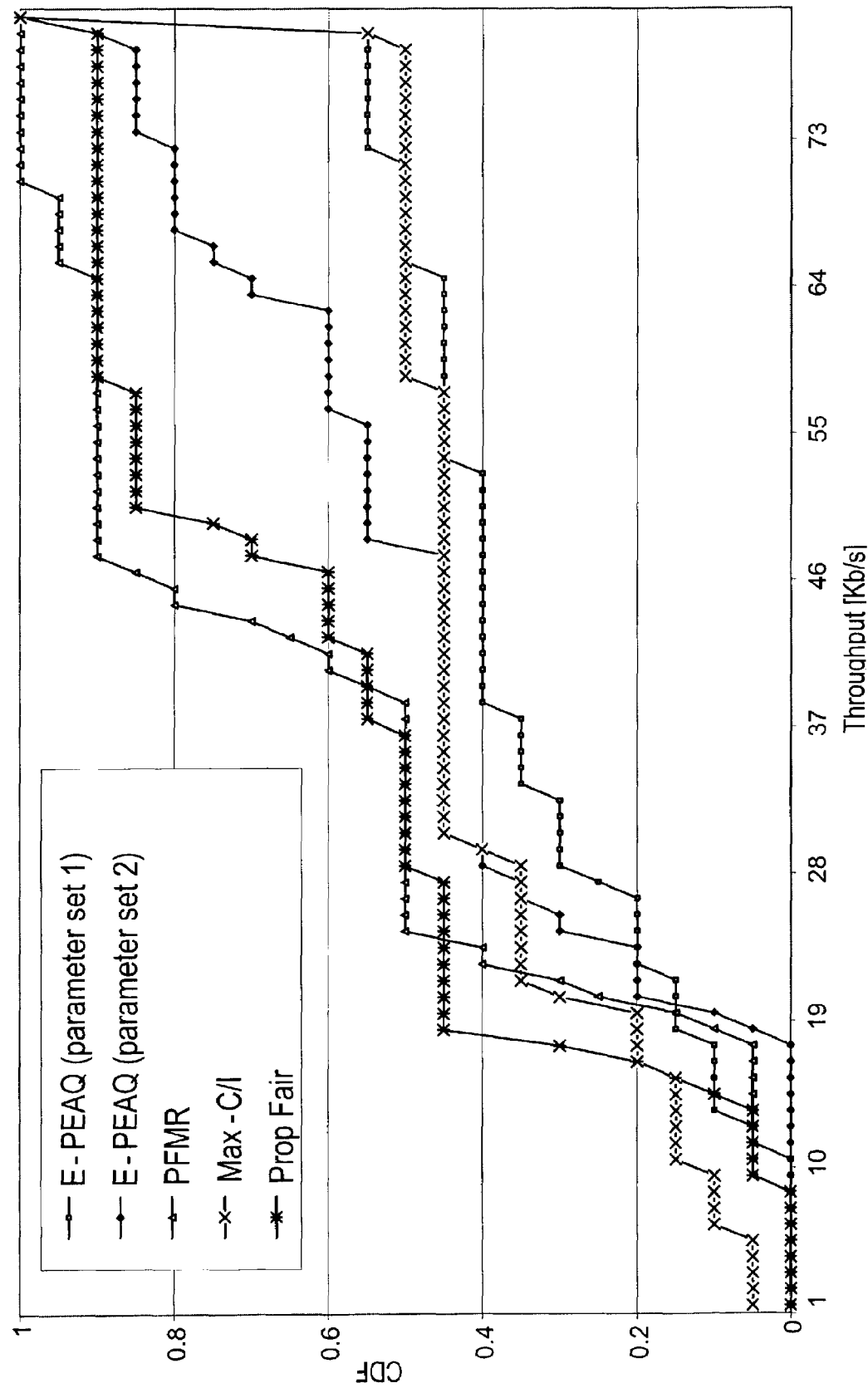

SCHEDULER AND METHOD FOR SCHEDULING TRANSMISSIONS IN A COMMUNICATION NETWORK

BACKGROUND OF THE INVENTION

1. Field of the Invention

The present invention relates generally to scheduling transmissions in communication systems.

2. Description of Related Art

New technical challenges emerge as telecommunication systems evolve from a second generation system offering pure voice services to a third generation system providing mixed voice and data services. In meeting data service demands, new performance metrics and algorithms need to be defined in order to optimize data performance.

The CDMA 3G-1× Evolution Data Only system (1×-EV-DO, also known as a High Rate Packet Data (HRPD) system) is an evolution system of cdma2000 3G-1× system, and is a pure data system to provide data services to mobile users. In 1×-EV-DO, a scheduler or scheduling function is provided in a base station controller in order to provide fast scheduling or management of system resources based on channel quality feedback from one or more mobiles. In general, a scheduler selects a mobile for transmission at a given time instant, and adaptive modulation and coding allows selection of the appropriate transport format (modulation and coding) for the current channel conditions seen by the mobile.

In second generation wireless communications systems such as those of the IS-95 standard, applications typically employ voice-based communication schemes, in which a connection between the base station and the mobile is a dedicated connection. Since these are essentially fixed connections, there is no need for prioritizing the order of transmission to the active users served by the system (an active user is a user with data to transmit at a current time instant). However, with the emergence of third generation wireless data communications systems, such as CDMA-2000 standard systems and 1×-EV-DO, management of system resources is paramount. This is because properties of data differ significantly from properties of voice. For example, a data transmission, unlike a voice transmission, is not necessarily continuous and may be embodied as a burst transmission or an intermittent-type transmission between a base station and a mobile, for example. Accordingly, a base station in a third-generation system will attempt to manage a large pool of data users by assigning radio resources to each user for transmission. Typically this is done utilizing a prioritization scheme controlled by a scheduler in the base station controller. In a conventional prioritization scheme, idle mobile's are assigned a lower priority than mobile with data to transmit.

Accordingly, the scheduler must be able to manage these large numbers of users without wasting radio resources of the communication system. This management function becomes even more important as a base station attempts to meet QoS (Quality of Service) requirements. QoS is a general term that may represent a number of different requirements. As a basic tenant, QoS is indicative of providing guaranteed performance (e.g., such as a minimum/maximum data throughput, a minimum delay requirement, a packet loss rate, and a packet download time, etc.) in a wireless communication system.

Quality of Service (QoS) differentiation in wireless data networks allows network operators to generate more revenue than is possible with best-effort scheduling policies. The promise of additional revenue is based on the willingness of end users (subscribers) to pay more for perceptible improvements in service (e.g., lower latency, higher throughput, or more predictable performance). QoS differentiation also enables deployment of new services (e.g., streaming audio/video, packet voice etc.) that cannot be provided with acceptable quality over best-effort scheduling policies or algorithms such as highest rate user first (HRUF)) scheduling, maximum carrier to interference ratio scheduling (Max C/I) and proportional fair (PF) scheduling, etc.

There has been efforts to develop scheduling algorithms for the scheduler in the base station controller to achieve QoS guarantees in wired and wireless networks. Prior efforts have resulted in scheduling techniques such as pure peak picking scheduling (i.e., the aforementioned HRUF or Max C/I)) proportional fair (PF) scheduling and variations of PF scheduling, referred to as Proportional Fair with Minimum Rate (PFMR) scheduling and Maximum Throughput with Minimum Rate (MTMR) scheduling, for example. However, because of the differences in channel characteristics, many of the QoS approaches designed for wired-line networks are not directly applicable to wireless data airlink. Thus, current scheduling techniques such as those above have not fully addressed QoS differentiation features that are becoming necessary for wireless data network operators to differentiate their services offerings from those of their competitors, in an effort to generate additional revenue. Accordingly, differences in performance for users in different service classes currently may not be perceivable by the end user, thus network operators need to see a benefit to a QoS feature, such as a QoS differentiation feature, before they purchase system equipment implementing such features.

SUMMARY OF THE INVENTION

A scheduler and a method for scheduling transmissions to a plurality of users in a communication network assigns a higher target minimum throughput for receiving a next transmission to a user based on a quality of service (QoS) class of the user. A token count that tracks the user's achieved performance relative to a target minimum throughput Is determined for each user in given timeslot, and a weight is determined for each user based on one or more of the token count and a current rate requested by the user. A user having the highest weight as determined by a weight function is scheduled to be served the next transmission. User priority for scheduling may be downgraded if an average data rate requested by the user is less than the target minimum throughput.

BRIEF DESCRIPTION OF THE DRAWINGS

Exemplary embodiments of the present invention will become more fully understood from the detailed description given hereinbelow and the accompanying drawings, wherein like elements are represented by like reference numerals and prime and multiple prime notation indicates similar elements in alternate embodiments, which are given by way of illustration only and thus do not limit the exemplary embodiments of the present invention and wherein:

FIG. 8 is a graph illustrating a comparison of user perceived average page throughput achieved by prior art scheduling algorithms and the scheduling method in accordance with the exemplary embodiments of the invention;

DETAILED DESCRIPTION OF EXEMPLARY EMBODIMENTS

Figure 1:
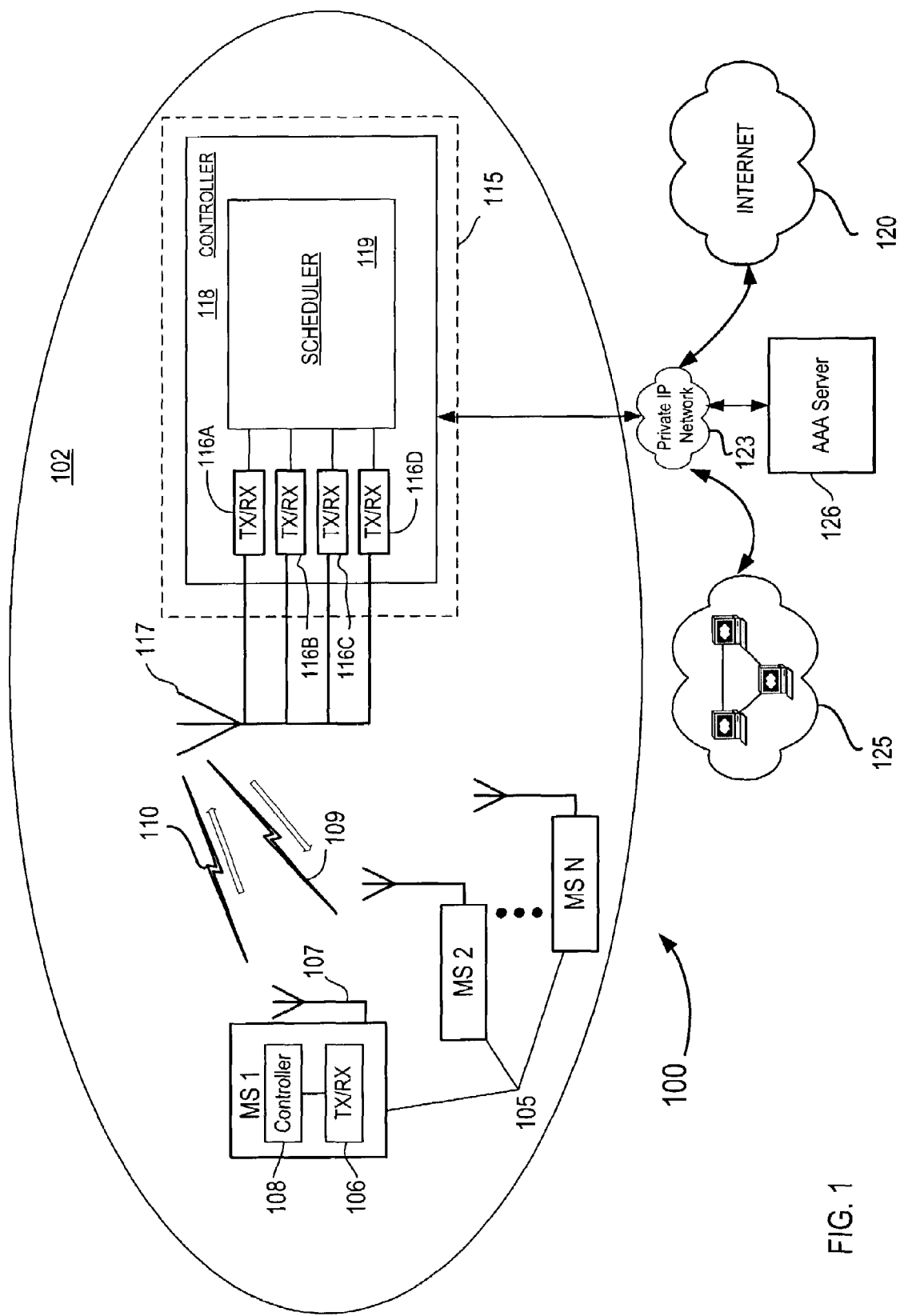
FIG. 1 is a block diagram of a communication system in accordance with an exemplary embodiment of the present invention.

The following description may be described as based on a wireless communication system operating in accordance with the cdma2000 1×-EV-DO standard. Although the exemplary embodiments of the present invention will be described in this exemplary context, it should be noted that the exemplary embodiments shown and described herein are meant to be illustrative only and are not limiting in any way. As such, various modifications will be apparent to those skilled in the art for application to other communications systems, such as the Universal Mobile Telecommunications System (UMTS) as reflected in the high-speed downlink packet access (HSDPA) system specification, for example, and are contemplated by the teachings herein.

The exemplary embodiments of the present invention are directed to a method for scheduling transmissions so as to (1) maximize user satisfaction by achieving QoS class-specific minimum throughput targets; and (2) to enforce QoS class-specific maximum throughputs to provide users with an incentive to upgrade service and potentially reduce sector activity.

Where used below, a mobile station is a device providing data connectivity to a user. A mobile station may be connected to a computing device such as a laptop, personal computer (PC), or it may be a self-contained data device such as a personal digital assistant (PDA) or cellular phone. Accordingly, a mobile station is equivalent to, and may be also be referred to as, an access terminal, wireless mobile, remote station, user, user equipment (UE), subscriber or any other remote user of wireless resources in a wireless communications network. Further, a mobile station may be functionally divided into a computing device such as a PC, which is responsible for point-to-point protocol (PPP) and higher later protocol functionality (IP, TCP, RTP, HTTP, etc.) and an access terminal (AT). The AT is responsible for the airlink and radio link protocol (RLP) layers.

Additionally as used herein, a base station refers to network equipment providing data connectivity between a packet data network (e.g., the Internet) and one or more mobile stations. A base station may be equivalent to, and may also be referred to as a base transmitter station, Node-B, access network or radio access network (RAN). An access network or RAN may be composed of one or more base stations.

As used herein, the transmission rate requested by a given user in a given slot, and/or the maximum downlink data rate achievable by a user in a given slot, is referred to as a DRC. The DRC may be embodied as part of a Reverse Traffic Channel or as part of a Reverse Control channel, i.e. a DRC channel. The DRC channel indicates the rate at which the user can receive a Forward Traffic Channel that carries specific information for that user, as well as the sector of the cell from which the user wishes to receive the Forward Traffic Channel from the base station serving the user.

Further, in the following discussion, transmission rates are expressed in bits per timeslot and numerically equal to the rate over that timeslot. Additionally, when the amount of data served or a "token count" is said to be incremented or decremented by a "rate," what is actually meant is the amount of data delivered at that rate in one timeslot.

In accordance with the exemplary embodiments of the present invention, QoS-differentiation may be achieved by a scheduler and method of scheduling transmissions which maintains each user's airlink data transmission rates between network operator-defined minimum and maximum values. Users who pay more for service are assigned higher minimum throughput targets. In addition, these higher QoS class users receive a higher share of residual airlink capacity.

Based on prevailing RF conditions, a coding rate and modulation scheme may be selected by the network to transmit data to a user. The throughput that can be achieved under the selected coding rate and modulation scheme is known for each user. Throughputs achievable by each user vary in time due to fluctuations in RF quality caused by log-normal shadowing, Rayleigh fading and fluctuation in interference power levels. To explain a framework for the exemplary embodiments in greater detail, the following notation is defined in Table 1:

TABLE 1

| Notation | |
|---|---|
| $R_i^{min}$ | Target minimum throughput for user i (bps). The target rate is a function of the QoS class, which the user has been assigned to by a network operator. Additionally, it can be a function of a QoS class requested by the user at the start of a data session. |
| $R_i^{max}$ | Target maximum throughput for user i (bps). |
| $\pi^{(j)}$ | Probability that the airlink is in state (j). |
| $r_i^{(j)}$ | Throughput user i would receive if the airlink is in state (j). This parameter reflects the data carrying capacity of the airlink under the coding rate and modulation scheme currently being used and the prevailing radio conditions corresponding to state (j) (bps). |
| $p_i^{(j)}$ | Fraction of airlink capacity allocated to user i when the airlink is state (j). ($0 \leq p_i^{(j)} \leq 1$.) |
| $c_i$ | "Revenue" generated by carrying traffic for user i. (E.g., Euro/bps, $c_i \geq 0$.) |

In accordance with the exemplary embodiments, the scheduling method casts QoS-differentiation as a solution to the following linear program:

$$\max_{p_i^{(j)}} \sum_i \sum_j c_i \cdot \pi^{(j)} \cdot p_i^{(j)} \cdot r_i^{(j)} \qquad \text{Equation 1}$$

subject to:

$$R_i^{\min} \leq \sum_j \pi^{(j)} \cdot p_i^{(j)} \cdot r_i^{(j)} \leq R_i^{\max}, \forall i \qquad \text{Equation 2}$$

$$\sum_i p_i^{(j)} = 1, \forall j \qquad \text{Equation 3}$$

$$p_i^{(j)} \geq 0, \forall i, j \qquad \text{Equation 4}$$

Cast in this manner, the scheduler selects the fraction of airlink slots to allocate to each user i when the channel is in state j, subject to keeping each user's throughput between target minimum and target maximum throughputs ($R_i^{min}$ and $R_i^{max}$). The objective function in Equation 1 represents the total expected revenue the network operator will earn over the air interface. The revenue factors $c_i$ are fairly generic. If, for example, the revenue factor $c_i$ is equal for all classes, the solution to the linear program above in Equations (1)-(4) maximizes the total throughput carried over the airlink (airlink capacity). If the network operator uses volume-based pricing schedules for different user classes, the revenue factor $c_i$ can be selected to reflect the relative rates paid by each service class (e.g., QoS class).

The constraint in Equation 1 embodies the notion of quality of service enforced by the scheduler. The term $$\sum_j \pi^{(j)} \cdot p_i^{(j)} \cdot r_i^{(j)}$$

denotes the average throughput a user will receive under its allocation of physical layer bandwidth. Network operators provide service differentiation by assigning different user classes different minimum throughput targets, the assumption being that users who pay more for wireless data service will be assigned higher minimum throughput targets. A user is "satisfied" if the network is able to provide the user with a throughput at or in excess of $R_i^{min}$. In other words, a user to be scheduled to receive a next transmission is assigned a data rate that is higher than $R_i^{min}$.

The constraint in Equation 2 also allows the network operator to specify a maximum throughput target $R_i^{max}$. Capping $R_i^{max}$ gives service providers an additional mechanism for differentiating the service experienced by different user classes. For example, network operators may want to limit the maximum throughputs observed by users in a particular QoS class even if additional airlink capacity is available. A potential downside to enforcing these limits is that it may leave airlink resources idle. However, keeping resources idle to encourage users to pay for premium service is a tried and true practice in the airline industry; for example: many air carriers would rather keep unsold first class seats open, rather than upgrading customers from business class. Such an approach gives air passengers an incentive to pay full fare for first class seats, rather than to take a chance on an upgrade from business class.

The constraint in Equation 2 can also accommodate network operators who don't wish to keep airlink resources idle if there is traffic to send: setting $R_i^{max}$ to infinity for all QoS classes achieves this result. The maximum target may be an easy parameter for network operators to understand, and may be an excellent measure of user-perceived performance.

In 1×-EV-DO and other wireless data technologies, the terms $r_i^{(j)}$ are known by the network, based on channel quality measurements reported by all mobiles. The formulation of the linear program in Equations 1-4 assumes the scheduler has an estimate of the channel state distribution $\pi^{(j)}$ a priori. Forming such an estimate and solving the linear program could add additional complexity to the scheduler, thus the formulation in Equations (1) to (4) may be simplified as follows.

$$\max_{p_i} \sum_i c_i \cdot p_i \cdot \bar{r}_i \qquad \text{Equation 5}$$

$$R_i^{min} \leq p_i \bar{r}_i \leq R_i^{max}, \forall i \qquad \text{Equation 6}$$

$$\sum_i p_i = 1 \qquad \text{Equation 7}$$

$$p_i \geq 0, \forall i \qquad \text{Equation 8}$$

In the above equations, $p_i$ is the fraction of airlink capacity allocated to user i; and $\bar{r}_i$ is the average throughput observed by user i.

The linear program in Equations (5) to (8) may provide a scheduling solution with the following properties:

Each user i is allocated at least enough airlink capacity to satisfy its minimum throughput target ($R_i^{min}$).

Additional airlink capacity is given to the mobile stations that can generate the largest revenue for the network operator, subject to the maximum throughput target $R_i^{max}$ (peak picking). For example, the mobile with the highest value of $c_i \bar{r}_i$ is allocated additional capacity, until it hits its maximum throughput requirements (or there is no more data to send to the mobile). Then the mobile with the next highest value of $c_i \bar{r}_i$ is allocated additional capacity until its maximum throughput is hit, and so on.

If the linear program is infeasible (the $R_i^{min}$ of all mobiles cannot be satisfied because the airlink is overloaded), the minimum throughput targets constraints in Equation 6 may be relaxed. This will be explained in further detail below.

FIG. 1 is a block diagram of a communication system in accordance with an exemplary embodiment of the present invention. System 100, which may also be configured as an high rate packet data (HRPD) system or network employing 1×-EV-DO technology, for example, may be illustrated by a cell 102 containing one or more mobile stations 105 in communication with, or served by a base station 115. Mobile station 105 may communicate through base station 115 to exchange packet data with the Internet 120 or some other packet data network 125, such as a closed corporate network (e.g., intranet) for example. Examples of packet data may include Internet Protocol (IP) datagrams used for applications such as accessing web pages and retrieving email. Such packet data applications may run on mobile station 105, or may run on a separate computer device that uses mobile station 105 as a wireless modem. In an exemplary embodiment, mobile station 105 may communicate with wireless network 115 over an air interface, which may be a set of forward and reverse channels for example. This may be shown as forward link 107 and reverse link 110.

Base station 115 may consist of a single base station and base station controller, or may include a plurality of separately located wireless base stations (e.g., access network and a base station controller connected together as an aggregate base station 115. Each base station may have a predetermined number of traffic channels to use for exchanging data with mobile stations 105. When one of the traffic channels is assigned to a mobile station 105, that mobile station 105 may be referred to as an active mobile station 105. At least one traffic channel is assigned to each active mobile station 105.

Base station 115 may be connected with packet data network 120 using back-haul facilities such as T1/E1, STM-x, etc, or any other appropriate type of network connection, such as wireless or wire-line T1 or T3, fiber optic connection, Ethernet, etc. Base station 115 may be connected to multiple packet data networks having more than one type. For example, instead of an intranet, another network 125 might be a public switched telephone network (PSTN) connected with base station 115 through a data services inter-working function (IWF).

In FIG. 1, base station 115 illustratively comprises a plurality of transceivers 116A-D, an antenna 117 connected to each transceiver, and a base station controller 118 connected with and controlling each of the transceivers 116A-116D. The controller 118 may include an airlink scheduler 119 or may implement a scheduling function or algorithm, for example. The mobile stations 105 are identical or substantially similar to one another. It suffices, therefore, to describe a single mobile station 105 which illustratively comprises a transceiver 106, an antenna 107 connected thereto, and a controller 108 also connected to the transceiver 106. Base station controller 118 also may contain 1×-EV-DO's Packet Control Function (PCF). In 1×-EV-DO, the PCF maintains active/dormant radio resource state information for each mobile registered for packet data service and maps mobile station ID's and connection references to a unique layer 2 connection identifier used to communicate with a Packet Data Serving Node (PDSN), not shown in FIG. 1 for clarity, it being understood that a PDSN is an interface between base station controller 118, via Private IP Network 123) and the Internet or another Packet Data Network (PDN).

Although controller 108 is shown as part of base station 115, base station controller 118 functions could be implemented by an external server which communicates with the base station 115 via a private IP network (not shown for clarity) like private IP network 123. For example, base station 115 could be connected, via private IP network 123 to a base station controller that resides on Lucent's Flexent Mobility Server (FMS).

Each of the plurality of mobile stations 105 communicates with the base station 115 and transmits thereto, in reverse link 110, a requested service rate (e.g., data rate request) DRC(n, i), n representing the n-th time slot for a transmission of data and i indicating the mobile station transmitting the requested service rate. The base station 115 allocates a next transmission of data in the n-th time slot. The allocation may be made according to a scheduling operation performed by scheduler 119 that may prioritize the plurality of mobile stations 105, so as to provide enhanced throughput control when implemented by the base station controller 118.

Air Interface

On the forward link 107, Time Division Multiplexing (TDM) may be employed to transmit data from the base station 115 to mobile stations 105. Downlink transmissions occur at fixed time intervals, or timeslots (hereinafter referred to as "slots", each slot having a fixed duration of 1.667 ms. A preamble within each slot indicates the user to whom this slot is allocated. Every mobile station 105 that can decode the pilot of the base station 115 performs an estimate of the channel between the base station that transmitted the pilot and itself. The base station 115's sectors to which the mobile station 105 has the best channel are included in the mobile station 105's active set, as in IS-95 and cdma2000 systems. However, unlike those systems, the mobile station 105 requests transmission from only one sector (the strongest one) served by base station 115 at any given time.

Scheduler 119 determines which mobile station 105 to transmit to in each slot. Since the scheduler 119 resides at the base station 115, the scheduler 119 may have the ability to quickly react and exploit the temporary peaks in different users' (mobile stations 105) channel conditions (channel condition is implicitly reported by the mobile station 105, as explained in further detail below), potentially optimizing the overall performance and capacity of the system 100.

The forward-link 107 may employ Incremental Redundancy (IR) for which a supporting physical layer acknowledgment/negative acknowledgment (ACK/NACK) procedure is employed. IR is a flexible approach that allows Hybrid Automated Repeat Request (HARQ) combining of copies of the original transmission that use potentially different modulation schemes. In general, HARQ allows combining of the original transmission with the new transmission, rather than to discard the original transmission. This greatly improves the probability of correct decoding of the packet. The word "hybrid" in HARQ indicates that Forward Error Correction (FEC) techniques have been used in addition to ARQ techniques. IR may help to ensure that transmissions resulting in unsuccessful decoding, by themselves, are not wasted.

Every mobile estimates the quality of the downlink channel. Based on this estimate, each mobile station 105 predicts the received SNR of the downlink channel. The predicted SNR is then used to predict the maximum downlink data rate achievable, or in other words the DRC, for a target packet error rate of about 1%. The DRC is embodied as a four-bit value on the DRC channel. The four-bit DRC values, which map to rates 38.4, 76.8, 153.6, 307.2, 614.4, 921.6, 1228.8, 1843.2 and 2457.6 Kb/s, for example, are fed back by each mobile station 105 on the DRC channel in reverse link 110. This information may be used by the scheduler 119 to assess the quality of each user's downlink channel, thus enabling peak-picking, e.g., scheduling the highest rate user first in a current slot to receive the downlink transmission.

In FIG. 1, mobile station 105 may be functionally divided into a computing device such as a PC, which is responsible for point-to-point protocol (PPP) and higher later protocol functionality (IP, TCP, RTP, HTTP, etc.) and an access terminal (AT). The AT is responsible for the airlink and radio link protocol (RLP) layers. When a mobile station 105 (mobile user) dials into the 1×-EV-DO system, the PDSN authenticates the user request by querying the AAA server 126 and subsequently establishes a PPP connection with the mobile station 105. This PPP connection is the medium for all data transfers to and from the mobile station 105. Since 1×-EV-DO airlink is subject to errors (the system operates at 1% packet error rate, on average), a Radio Link Protocol (RLP) is employed for performing ARQ to recover lost or corrupted data. The residual error rate after RLP recovery procedure is quite small and hence does not significantly impact TCP throughput. RLP functionality is implemented in the base station controller 118.

Airlink Scheduling in 1×-EV-DO

Depending on coding rate selected and the quality of the channel, transmission of a single frame, such as a Radio Link Protocol (RLP) frame from the base station 115, may span multiple airlink slots. In 1×-EV-DO, IP packets belonging to a user are segmented into fixed, 128-byte RLP frames at the base station controller 118, which may or may not be part of the base station 115. Functions of the base station controller may be implemented by an external server communicating with a base station via a private IP network 123, for example, and then transported to the base station 115. Depending on the DRC feedback received in the DRC channel from the mobile station 105, the base station 115 decides how many RLP frames can be sent in a slot and the corresponding modulation and coding scheme. If the mobile station receives an RLP frame in error, it sends a NACK (Negative Acknowledgment) and the RLP frame is re-transmitted. Only one retransmission is allowed per RLP frame. Once the mobile station receives all the RLP frames belonging to a PPP frame, the PPP frame is re-assembled and handed over to the PPP layer for further processing.

Hence, some slots are "reserved" for RLP frames that are in the process of being transmitted to a mobile station 105. Unreserved slots, however, can be allocated to any mobile station 405. If a slot is unreserved, a scheduling function in accordance with an exemplary embodiment of the present invention may be invoked by scheduler 119 to determine which of the mobile stations 105 with pending downlink data and suitable link performance should be allocated the slot. A DRC value of 0 is used by mobile stations 105 to inform the base station 115 that the downlink channel has an unacceptably high error rate. If the slot is reserved, implying that there was a mobile station 105 that sent a NACK for a transmission before, then the base station 115 transmits some more coded bits to the mobile station 105 in the current slot.

As will be seen in further detail below, the scheduler and scheduling method in accordance with the exemplary embodiments of the present invention employs QoS class-specific minimum and maximum rates. QoS class-specific may be defined as classes of users that are arranged based on how much each user or subscriber pays for specified services and data rates, for example. Alternatively, QoS class could be based on the nature of traffic a user may be carrying, for example, real time, non-real-time, etc. At each unreserved slot, the scheduler 119 selects a user (mobile station 105) in such a way that these minimum and maximum rates are enforced over a suitable time horizon.

QoS Class-specific Rates

Central to the scheduler 119 is the notion of QoS class-specific minimum ($R_i^{min}$) and maximum ($R_i^{max}$) rates. As discussed above, at each unreserved slot the scheduler 119 chooses the mobile station 105 in such a way that these minimum and maximum rates are enforced over a suitable time horizon. Since the airlink is the most limited resource in the system 100, it is apparent that enforcing minimum rate requirement must be done on the airlink. Maximum rate on the other hand can be enforced either on the airlink or in the back-haul network. For example, the PDSN can maintain a measure of the traffic flowing into the radio access network (containing base station 115) from the Internet and appropriately drop packets that exceed their subscribed $R_i^{max}$. On the other hand, $R_i^{max}$ can be made an integral part of the ranking computation performed at the scheduler 119. Accordingly, $R_i^{max}$ is enforced at the PDSN and the base station 115 performs the task of maximizing system throughput while enforcing minimum rates.

Figure 2:
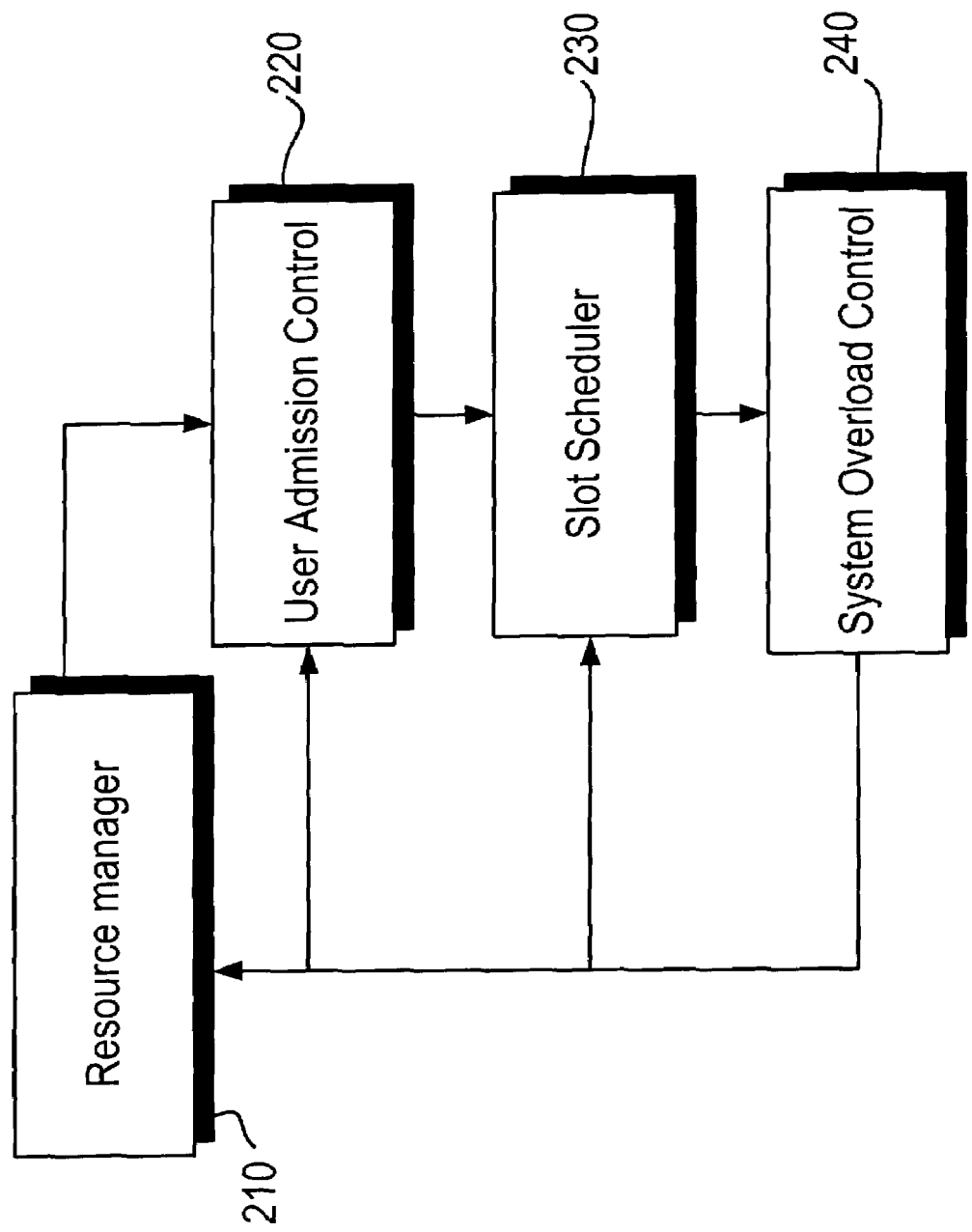
FIG. 2 is a flow diagram of scheduling function architecture of a scheduler in accordance with an exemplary embodiment of the invention.

FIG. 2 is a flow diagram of scheduling function architecture of a scheduler in accordance with an exemplary embodiment of the invention. FIG. 2 describes an exemplary scheduling function architecture for the scheduler 119.

Referring to FIG. 2, a resource manager function 210 has the responsibility of overall coordination and information exchange between the User Admission Control function 220, Slot-scheduler function 230 and System Overload Control function 240. Admission Control function 220 monitors the control load of the base station 115 and performs a realistic estimate of the long-term feasibility of the system 100, should a new user (new mobile station 105) be admitted. Based on this, the decision of whether admitting a particular user or not is made.

The Slot-scheduler function 230 operates at the timescale of an airlink slot ($n^{th}$ slot), deciding which user to allocate the current slot to in-order to meet a scheduling objective. The overload control function monitors the downlink data traffic load, the rate of increase of load, and the sum total of the target $R_i^{min}$ values of admitted users to determine whether the system is entering an overload condition or not. If an overload condition is indeed detected, it identifies a user or a set of users (i.e., mobile stations 105) to be downgraded (temporarily assigned $R_i^{min}$ values smaller than desired, or, in extreme cases, halting altogether the transfer of data to users) so that the scheduler 119, and hence system 100, quickly comes back into normal operating condition.

From the scheduler 119 point of view, the only user information that is needed is the DRC feedback. The scheduler does not need information about the volume of data pending for a particular user, nor does it require information of when a particular user's data has arrived. The System Overload Control function 240 or the Slot-scheduler function 230 may need to maintain an average DRC reported for each mobile. Using this information, users in poor channel conditions, when compared with their $R_i^{min}$, can be identified and appropriately downgraded in priority for scheduling the user to receive a next transmission from base station 115.

Figure 3:
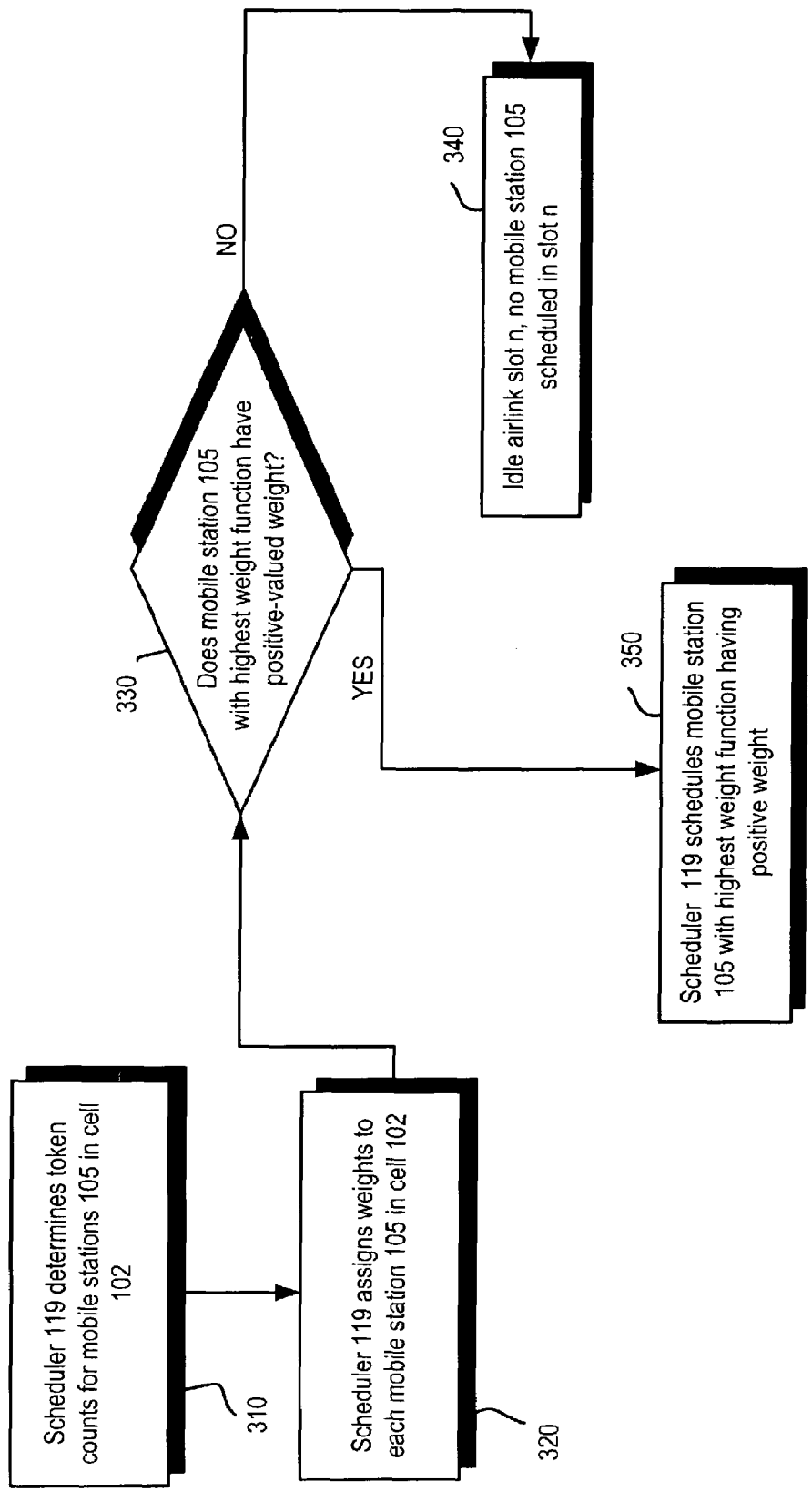
FIG. 3 is a flow diagram illustrating a scheduling method in accordance with an exemplary embodiment of the invention.

FIG. 3 is a flow diagram illustrating a scheduling method in accordance with an exemplary embodiment of the invention. In FIG. 3 and subsequent discussion, the terms user and mobile station are occasionally used interchangeably.

In general, mobile stations 105 in cell 102 may be scheduled in order of the quality of service (QoS) class of the mobile user. Those users paying premium rates may be assigned a higher target minimum throughput for receiving a next transmission that users of lower QoS classes. Further users paying premium rates may be allocating residual airlink bandwidth, since they subscribe to a higher class of service. As discussed previously, this may be a function of the average user throughput of the user and the revenue generated for the network by carrying traffic for the user.

Referring now to FIG. 3, in order to prioritize users for scheduling, so as to assign an $i^{th}$ user a rate higher than $R_i^{min}$ to receive a next transmission in an $n^{th}$ slot, a token count that tracks a mobile station 105's ($i^{th}$ user's) achieved performance relative to $R_i^{min}$ is determined (function 310). $R_i^{max}$ and $R_i^{min}$ may be determined by the scheduler 119 as a function of a quality of service (QoS) class of the mobile station 105 as assigned by the network. Alternatively, $R_i^{max}$ and $R_i^{min}$ may be a function and of a QoS class requested by the mobile station 105 at the start of a data session between the mobile station 105 and base station 115. As will be seen in further detail below, the token count may be temporally updated (updated in time) for a scheduled user after each scheduled transmission, for example, and the token count may also be restricted within a given token range.

A weight for each user is determined (function 320) by the scheduler 119. The weight may be determined using a weight function that includes the rate requested by the mobile station, i.e., the DRC feedback received by the base station 115 in the DRC channel. The weight function may also be used to determine the weight based on the token count. The weights computed from function 320 may be positive or negative. Accordingly, a user that has the highest resultant weight function that is positive is selected as the scheduled user, to be assigned a rate higher than $R_i^{min}$ when being served the transmission. Hence if there is no user with a positive resultant weight function (output of function 330 is NO), then no user will be scheduled and the airlink slot may be idled (function 340). Accordingly, the mobile station 105 with the highest positive-valued weight is selected (function 350) as the user to be served, or scheduled, to receive a next scheduled transmission in the current airlink slot.

Scheduling with Minimum Throughput Enforcement

The scheduler 119 should satisfy the minimum throughput requirements ($R_i^{min}$) for a substantially large fraction, if not all the mobile stations 105. While doing so, the scheduler 119 should also exploit multi-user diversity arising from temporal variations in channel quality, in order to achieve better efficiency.

Accordingly, the scheduler 119 may be configured so as to combine the benefits of a control mechanism designed to meet user satisfaction, together with benefits of peak picking (capacity enhancement, lower interference, and higher revenue). For example, at each scheduling instant (i.e., slot n), the scheduler 119 decides whether to schedule a poor user (mobile station 105) that has a relatively high valued token count, thus indicating that the user has been falling short of its $R_i^{min}$, or whether to perform peak picking (i.e., schedule the user with the highest requested rate (highest DRC)). Peak picking helps maximize system 100 throughput, and may also allow the completion of packet calls for "good" users (mobile stations 105), thereby freeing system 100 resources for "poor" users.

In general, user satisfaction may be heavily limited by the resource allocation to the poor users, since these are typically the hardest to satisfy. Poor users typically need to be scheduled frequently in order to meet their target minimum throughputs. However, in accordance with the exemplary embodiments, the time instants or slots at which poor users are scheduled depend on (a) the token count, which is a measure of a current dissatisfaction level relative to $R_i^{min}$, an (b) current requested (or achievable) rate (i.e., DRC).

In order to track how well the scheduler 119 is meeting each user's minimum throughput target, scheduler 119 may employ a variation of the well-known "leaky bucket algorithm". The leaky bucket algorithm uses a token counter that maintains a token pool Ti(n) of bits for an i-th user in an n-th slot. This token counter increments or decrements token counts. As discussed above, the token count or "token" may be a measure of a dissatisfaction level of a user, and is determined for each mobile station 105 in a given slot.

The counter may be incremented at user i's target minimum throughput, i.e., $R_i^{min}$ (bps), or by a quantity proportional to $R_i^{min}$ in the $n^{th}$ slot. Whenever the scheduler 119 transmits $b_i$ scheduled bits to user i, $b_i$ bits may be withdrawn from user i's "token bucket". The term $b_i(n)$ is referred to as a depletion rate, and may represent the number of bits transmitted to the $i^{th}$ user in the $n^{th}$ slot (in bits/slot). In the present invention, the traditional leaky bucket algorithm is modified to operate acceptably within the context of 1×-EV-DO scheduling, for example.

A. Token Replacement—Updating the Token Count

The token bucket scheme employed in the present invention is an adaptation of the leaky bucket formulation, and allows for fair scheduling and class-based differentiation. A total of $X_i$ tokens are put into user i's bucket at each slot, where $X_i$ is the product of the target minimum rate and the slot duration. At each time slot n, the depth of a user i's token pool, $T_i(n)$, is taken into account in making a scheduling decision. When scheduled, the user's bucket is depleted by a number of tokens $b_i$ corresponding to the bits transmitted in the $n^{th}$ slot. The evolution of the token pool, i.e., the means by which a current token count value for an $i^{th}$ user in an $n^{th}$ timeslot, may be updated (i.e., incremented or decremented), can therefore be described as:

$$T_i(n)=T_i(n-1)+X_i(n)-b_i(n), \text{ with } X_i(n)=\alpha R_i^{min}/600$$
$$\text{(bits/slot).} \qquad \text{Equation 9}$$

Equation (9) may represent a token replacement rate. QoS class-based differentiation may be achieved through the appropriate selection of the token replacement rate. In Equation (9), $X_i(n)$ is proportional to $R_i^{min}$ and may represent a token rate that represents a product of the target minimum throughput for user i and the timeslot duration, $\alpha$ is a tunable parameter that permits the token rate to be set at a value higher than $R_i^{min}$ for a given period, and $b_i(n)$ represents the number of bits transmitted to the user i in timeslot n, e.g., $b_i(n)$ is the depletion rate discussed above.

A traditional leaky bucket scheme enforces strict policing, in that, the number of bits transmitted by a user cannot exceed the size of the user's token pool. In other words, at time n, a user can transmit at most $T_i(n)$ bits, or, $b_i(n) \leq T_i(n)$. The strict formulation of such a scheme would prove disadvantageous in the present invention, as it lacks the flexibility to adapt to the changing channel conditions that are typical of a wireless channel.

B. Depletion Rate

The role of the token replacement rate in scheduling having been thus described, the depletion rate $b_i(n)$, or rate at which user i's token pool is decremented in the nth slot, is further explained. In updating the user tokens with the number of bits transmitted, possibly across multiple slots, three options have been considered:

1. Update tokens by the entire number of bits transmitted, at the start of the transmission.
2. Update tokens by the entire number of bits transmitted, at the end of the transmission.
3. Compute the number of bits transmitted per slot at the expected rate. Update tokens by this number every slot until transmission is successfully completed. At the end of the transmission, update token by the remaining number of bits.

The following example illustrates the three options: Consider a user i with $DRC_i[n]=1$. At this DRC level, the user is expected to take no more than 16 slots to successfully transmit 1024 bits, which translates to a rate of 38.4 kbps. Let the actual number of slots taken by the user for successful transmission be M. Note that $M \leq 16$, otherwise the transmission is considered unsuccessful and must be repeated. During the interval 0≤m<M, tokens are updated according to equation (1) with $b_i[n+m]$ as shown below in Table 2.

TABLE 2

| | $b_i[n + m]$ | | |
|---|---|---|---|
| Option | m = 0 | 0 < m < M − 1 | m = M − 1 |
| 1 | 1024 | 0 | 0 |
| 2 | 0 | 0 | 1024 |
| 3 | 64 | 64 | 1024 − 64(M − 1) |

Referring to Table 2, Option 1 is unfair to the scheduled user, as the scheduled user's tokens are reduced before service has completed, reflecting a much higher rate than the user receives. Option 2 on the other hand favors the scheduled user, not decreasing tokens until the entire service is completed, thus allowing an advantage over other users in the interim. Option 3 is the most fair of the three, but involves a little more implementation complexity. In case of unsuccessful transmission, $T_i(n)$ should ideally be decremented by the corresponding number of bits. However, since the probability of these events is exceedingly low, they can be safely neglected.

The exemplary embodiment makes further refinements to the traditional leaky bucket scheme to halt the accumulation of tokens when mobiles are idle for long periods of time, as is the case for users surfing the web or running other applications that sporadically generate traffic. In addition, the initial amount of tokens placed in each user's bucket at the time a transmission begins has a large influence on the delay performance of applications sporadically transmitting data. Further, the scheduling method should be able to distinguish between idle and busy periods when updating user tokens. Accordingly, the token counts of the token counter may be restricted to a specified range, and may be initialized so as to account for delay performance of applications sporadically transmitting data, for example.

C. Range Restriction—Limiting the Depth of the Token Bucket

The size of the token pool $T_i(n)$ is a good indicator of user i's dissatisfaction. A mobile station 105 who has not been served over a considerable period of time could accumulate a fairly large number of tokens. Conversely, for a mobile station 105 who is served often, the size of the token pool could even take on negative values. Any token-based scheduling scheme thus has an built-in memory that reflects the service given to a user over a period of time. In the exemplary embodiment, this memory may be a sliding window in scheduler 119. The memory may be effective in providing a degree of user satisfaction, but could be a handicap if tokens are allowed to "run away", i.e., take on an excessively large negative or positive value. In such situations, system recovery may be slow, starving some users in the meantime, while providing unnecessary service to others.

In the exemplary embodiments in accordance with the present invention, this problem is addressed by capping tokens, i.e., by restricting them to a given range ($T_{MIN}$, $T_{MAX}$). The maximum allowed bucket size, $T_{MAX}$, limits the memory in the sense that if the token bucket is already full of tokens, incoming tokens overflow and are not available in the future. Thus, at any time, the largest burst a user can send into the network (i.e., system 100) is roughly proportional to the size of the bucket. Similarly, the token count cannot fall below a minimum, $T_{MIN}$.

The rate at which tokens are placed in a user's (mobile station 105) bucket in each slot is typically much smaller than the depletion rate $b_i(n)$. Thus, recovery from very large negative token values is slow. For example, consider a case of a user with good channel conditions in a lightly loaded system, who experiences repeated service initially, leading to a large negative token value. If the system load now begins to increase, or if the systems' channel condition suddenly deteriorates significantly, the user will not be able to contend with other users with high token values.

Consequently, the user will not be scheduled for a considerable amount of time. Accordingly, to solve this problem, the length of time during which a backlogged user with negative tokens is not served may be tracked. Once this duration crosses some specified or pre-determined threshold, the user's tokens are reset by a token count value initialization routine implemented by scheduler 119. This "efficient token scheme" therefore may permit a controlled degree of burstiness, maximizing the advantage gained through multi-user diversity, while still attempting to guarantee, in the long-term, that the transmission rate for any backlogged user i will not exceed the token replacement rate.

D. Initialization of Token Value for New User

The token value of a new mobile station 105 entering the system 100 should be set. If the scheduler 119 sets the initial token value for a new user too low, the initial packet transmitted to the new mobile station 105 will experience a larger than desirable delay. This may affect Transmission Control Protocol (TCP). TCP is a byte-stream, connection-oriented, reliable delivery transport layer currently documented by IETF RFC 793, a standards document specified by the Internet Engineering Task Force (IETF) to describe how TCP should behave. In the TCP/IP model, TCP provides an interface between a network layer below and an application layer above.

In the case of TCP, this initial delay can lengthen the amount of time TCP remains in its slow-start phase. Slow start phase of TCP is the phase during which TCP is discovering the available channel bandwidth. If this process is slow, then the time taken by TCP to learn is large and hence the resulting throughput would be lowered, reducing TCP throughput seen by the mobile station 105. On the other hand, setting the token too high will guarantee service to the mobile station 105 for an unreasonably long period of time, thus penalizing other mobile stations 105 in system 100.

For a user j (i.e., a mobile station 105), entering the system 100 at time n, the tokens $T_j(n)$ are initialized so that if not served within m slots, the user's projected weights will equal the weight of the currently served user. In other words, if parameter $A^{max}[n-1]$ represents a number of weights corresponding to the user scheduled in slot (n−1), user j's tokens, represented as $T_j(n)$ are initialized to a value as evidenced by the following equation (10).

$$A^{max}(n-1) = (1 + \delta_j) \log(DRC_j(n)) + a_j(T_j(n) + mX_j) \quad \text{Equation 10}$$

$$\text{i.e., } T_j(n) = \frac{A^{max} - (1 - \delta_j) \log(DRCj(n))}{a_j} - mX_j$$

In equation (10), $\delta_j$ is a rate request exponent for user j; $DRC_j$ is the current rate requested by user j, and $\alpha_j$ represents a user satisfaction bias for user j. The parameter Xj is proportional to $R_j^{min}$ and in particular is a token rate is given by the following equation (11):

$$Xj = \alpha_j R_j^{min}/600 \text{ (bits/sec)}, \qquad \text{Equation 11}$$

where $\alpha j$ is a tunable parameter and $R_j^{min}$ represents the target minimum throughput (e.g., $R_{min}$) for user j. Since the token rate is computed directly from $R_j^{min}$, it is QoS class-dependent. If $DRC_j(n)=0$, then $T_j(n)$ may be calculated as defined in equation (12):

$$A^{max} = (1 + \delta_j) \log(38400) + a_j(T_j(n) + mX_j) \qquad \text{Equation 12}$$

$$\text{i.e., } T_j(n) = \frac{A^{max} - (1 + \delta_j)\log(38400)}{a_j} - mX_j,$$

where m can be selected as required. Accordingly, an initial token value may be set in accordance with equations (10) to (12) so as to account for any delay due to applications sporadically transmitting data, for example E. Token Updated in Idle Periods A central idea for updated user tokens is to distinguish between idle periods caused by network delays (or TCP slow start) and those attributed to think times (user initiated delays). The latter case is viewed as the arrival of a new job, thus a natural approach would be to re-initialize the token value when the buffer becomes non-empty.

In the former case two alternatives are considered, one, which involves freezing tokens for the entire duration of the idle period and the second, which continues to update tokens during the initial part of the idle period and freezes them later. When tokens are frozen a user, experiencing an empty buffer due to network problems, is not given a higher priority. This is an advantage when network problems are unrelated to the wireless link, but it is a definite drawback when they are caused by poor scheduling, which introduces high throughput variability leading to TCP timeouts.

The second alternative continues updating tokens as usual until the mobile station 105 (i.e., the $i^{th}$ user) is given a scheduling opportunity. The mobile, having no data in its buffer, cannot make use of this opportunity. In order to prevent an uninhibited build up of its tokens, scheduler 119 keeps account of the missed scheduling opportunities by incrementing a counter Fi. Once Fi exceeds a threshold NS during the current idle period, the scheduler 119 freezes the tokens.

Typically, network delays resulting in TCP time-outs would not be expected to exceed 2-3 times the TCP Round-trip response duration (~1 sec). User think-times, in comparison, tend to be much larger (~10-30 sec). The scheduler 119 keeps track of the length of an idle period by updating counter Ci. If Ci exceeds a threshold NT, the scheduler 119 attributes an idle period to be a user-initiated delay, otherwise, it is deemed a network-related delay.

F. Downgrading Priority in Overload Condition.

As discussed above with respect to FIG. 2, if an overload condition is detected, the scheduler 119 identifies a user or a set of users (i.e., mobile stations 105) to be downgraded (temporarily assigned $R_i^{min}$ values smaller than desired, or, in extreme cases, halting altogether the transfer of data to users) so that the system 100 quickly comes back into a normal operating condition. The System Overload Control function 240 or the Slot-scheduler function 230 in scheduler 119 may need to maintain an average DRC reported for each mobile. Using this information, users in poor channel conditions, when compared with their $R_i^{min}$, can be identified and appropriately downgraded in priority for scheduling the user to receive a next transmission from base station 115.

Thus, when a user's channel condition is persistently so poor that its average requested channel rate falls short of the minimum rate guaranteed to its service class, the user's transmitted rate can never meet its required $R_i^{min}$; the best it can do is to meet its average channel rate or DRC. The average DRC is simply the bit rate requested by the DRC in each slot passed through an IIR filter with the same time constant. The scheduler 119 can keep track of the average channel condition $\overline{DRC}_i$ for each user i, using an IIR filter with time constant T. This may be defined by Equation (13):

$$\overline{DRC}_i[n] = \overline{DRC}_i[n-1]\left(1 - \frac{1}{T}\right) + DRC_i[n]\left(\frac{1}{T}\right). \qquad \text{Equation 13}$$

The scheduler 119 provides a check that temporarily downgrades the user i when $\overline{DRC}_i[n] < R_i^{min}$, by resetting the token rate to $$X_i = \frac{a_i \cdot \overline{DRC}_i[n]}{600} \text{ bits/slot},$$

or, even more aggressively to $$X_i = \frac{a_i \cdot \rho \cdot \overline{DRC}_i[n]}{600 \cdot N} \text{ bits/slot},$$

where N=number of active users in the system, and $\rho$=multi-user diversity gain. This check need not be implemented every slot, but at regular intervals.

G. Weight Functions Calculations

The scheduler 119 assesses the relative benefits of scheduling dissatisfied users and peak picking by comparing individual weight functions computed by the following two scheduling routines: The first scheduling routine is a channel quality and user dissatisfaction sensitive scheduling routine, which computes a weight function defined by Equation (14):

$$W_i^1 = DRC_i^{(1+\delta_i)} exp(\alpha_i T_i), \qquad \text{Equation 14}$$

where $DRC_i$ denotes the rate requested, $\delta_i$ denotes a rate request exponent, and $\alpha_i$ denotes a small positive value that is related to the QoS class of the user. The parameter $\alpha_i$ may be set to a small value to ensure algorithm stability, for example, such as 0.0001 for bronze class (class of users paying a lower subscription fee) and 0.0005 for a gold class. $T_i$ denotes the current token count value, respectively, for the $i^{th}$ user.

The second scheduling routine is a pure peak picking scheduler, with weight function given by Equation (15):

$$W_i^2 = DRC_i. \qquad \text{Equation 15}$$

Equations (14) and (15) are implemented by scheduled 119 for each mobile station 105. The scheduled user is then chosen by scheduler 119 to match the decision by the scheduling routine in Equations (14) and (15) that has the higher resultant weight function, i.e., $$j = \underset{i: W_i^1 \times W_i^2 > 0}{\operatorname{argmax}} \{W_i^1, W_i^2\}. \quad \text{Equation 16}$$

In Equation (16) above, both $w_i^1$ and $w_i^2$ must be positive. Hence, if there is no user with both $w_i^1$ and $w_i^2$ positive, then no user will be scheduled and the airlink slot will be idled (see for example, functions 330 and 340 in FIG. 3).

To enforce $R_i^{min}$ when scheduling transmissions in accordance with the exemplary embodiments of the present invention, the user tokens are employed as a measure of temporal dissatisfaction. Tokens are decremented when a user (i.e., mobile station 105) is scheduled. For any user, regardless if whether the user is scheduled, tokens are incremented by an amount proportional to the user's target minimum throughput ($R_i^{min}$). At any instant, the accumulated tokens may be roughly proportional to the difference between the token rate, which may be a rate set to at least equal $R_i^{min}$, and the actual served rate that the user is experiencing. When a user is dissatisfied (i.e., perceived rate is below token rate), its tokens accumulate. The exponential term in Equation (13) eventually starts to dominate the user channel quality and the user gets scheduled. When all users are satisfied, their tokens are negative and the scheduling method, as evidenced by the scheduling routines in expressions then depends solely on the user channel quality to make a scheduling decision. In other words, distribution of excess bandwidth among users depends primarily on user channel quality, and users with better DRC get a larger share of the channel.

Examples and Results

A simulation was conducted to gauge the performance of the scheduling method in accordance with the exemplary embodiment of the present invention. For FIGS. 4-8, the scheduler and/or scheduling method is referred to as "E-PEAQ". E-PEAQ was compared against prior art scheduling algorithms Proportional Fair with Minimum Rate (PFMR), maximum C/I, and PF, in terms of user satisfaction (ability to satisfy minimum throughput targets) and airlink capacity. The simulations were used to analyze the performance of these different scheduling algorithms for a long file transfer application (FTP) and web page transfer application (HTTP).

The simulation setup was as follows. The airlink between the base station and the mobile was modeled via a trace file that contained the predicted DRC feedback from each mobile. The trace file contained information on how many slots were needed for successful transmission, once a particular DRC was chosen. Further, the trace file also indicated whether the MAC packet would be in error or not after the total number of physical layer retransmissions were completed.

Two such trace files were considered. The first one, named a0.dat, reflected a scenario of single path Rayleigh fading and mobile speed of 3 Km/Hr. The second trace file, named a30.dat, also reflected the scenario of single path Rayleigh fading but with a higher mobile speed of 30 Km/Hr.

The RLP layer was also modeled between the mobile and the base station controller (e.g., FMS) in order to recover the lost frames. Moreover, FTP and HTTP application layer protocols were implemented at a host and also at the mobile. Since both FTP and HTTP application layers use TCP for data transfer, TCP (Reno version) was used at the mobile and at the host. The Internet was modeled as a fixed delay network with no losses. A summary of the different parameters and their values is given in Table 3 below.

TABLE 3

Summary of Simulation Parameters

| Parameter Name | Value |
| --- | --- |
| TCP Version | Reno |
| TCP Maximum Segment Size (MSS) | 1500 Bytes |
| TCP Maximum Window Size | 64 KB |
| HTTP Version | 1.0 |
| Number of Parallel TCP Connections per page | 1 |
| Number of objects in a page | 1 |
| Distribution of object size | $Pr\{O = 5\text{ KB}\} = 0.2$ |
| | $Pr\{O = 30\text{ KB}\} = 0.3$ |
| | $Pr\{O = 60\text{ KB}\} = 0.3$ |
| | $Pr\{O = 80\text{ KB}\} = 0.2$ |
| Think time between pages | Exponentially distributed with a mean of 10 sec |
| Trace File used | a0.dat for FTP |
| | a30.dat for HTTP |
| Number of Users | 40 for FTP |
| | 20 for HTTP |
| Delay from Host to FMS | 150 ms |
| RLP Delay from FMS to Mobile | 100 ms |
| Simulation Time | 2000 sec |

Performance Metrics of Interest

In case of FTP, the performance metrics of interest were:

Aggregate System Throughput: This metric indicates the total kilobits per second, per sector, per carrier, that can be carried in the 1x-EV-DO system. This is computed as the total number of successful bytes transferred by all mobiles divided by the simulation time.

User Satisfaction: Since the minimum guaranteed rate is common to all the scheduling schemes, it is of interest to check how many users are essentially receiving a data rate greater than or equal to the minimum rate.

Cumulative Distribution Function (CDF) of user perceived throughput: Given that users in the sector are in different RF conditions, it is of interest to see how the distribution of data rates, across all users, varies from one scheduling scheme to the other.

In the case of HTTP, the performance metrics of interest were:

Normalized Page Delay: Since HTTP is a request/response type of application protocol, delay or the response time is more reflective of user perceived performance than throughput. Moreover, since delay is larger for larger pages, normalizing the page transfer delay with the page size is a good indication of the average time a user has to wait for each kilobyte.

Average User Perceived Throughput and Satisfaction: Similar to the case of FTP, it is of interest to calculate the average user perceived throughput and compare it with the minimum rate requirement. This will indicate how many users are "satisfied".

Aggregate System Throughput: Although the number of simultaneous active users is small with a HTTP type application, it is of interest to see the total system throughput for different scheduling schemes.

Average Page Throughput: Among all the pages successfully downloaded in the system, it is of interest to determine the average throughput obtained for each page, across all users. However, note that typically users in good locations download the pages faster and hence on average, generate more pages than users in poor locations. Hence, this metric is biased by the performance of good users.

FTP Results

A group of 40 users was considered, all having the same minimum throughput target and simultaneously doing an FTP download, for a duration of 2000 seconds. The a0.dat trace file was used for modeling the airlink, and a minimum throughput target of 9.6 Kb/s was set for all users. The value of $\alpha_i$ was set to $1/(1000*9.6*1.667 \text{ ms})$ for all three schemes. E-PEAQ with two different parameter settings were studied (a) E-PEAQ (parameter set 1), $\delta i$=0.2, and E-PEAQ (parameter set 2), $\delta i$=0, $T_{MIN}$=0.

Figure 4:
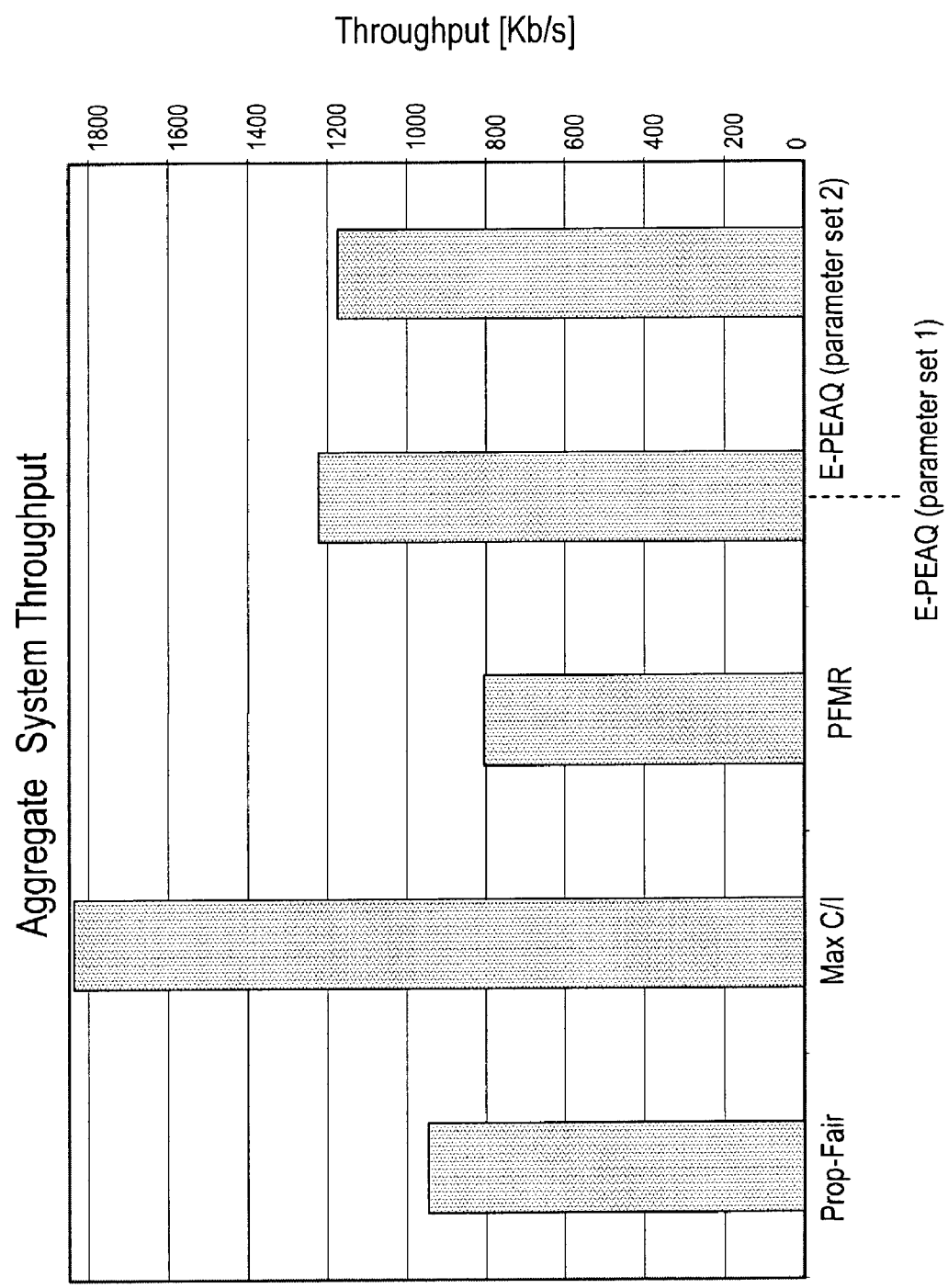
FIG. 4 is a graph illustrating a comparison of aggregate system throughput for file transfer application layer protocol (FTP) achieved by prior art scheduling algorithms and the scheduling method in accordance with the exemplary embodiments of the invention.

FIG. 4 is a graph illustrating a comparison of aggregate system throughput for file transfer application layer protocol (FTP) achieved by prior art scheduling algorithms and the scheduling method in accordance with the exemplary embodiments of the invention. In FIG. 4 it is shown that E-PEAQ (parameter set 1) and E-PEAQ (parameter set 2) both outperform PFMR in terms of the aggregate system throughput with E-PEAQ (parameter set 1) achieving the highest throughput among the three. Max C/I achieves the highest throughput among all the five scheduling schemes considered.

Figure 5:
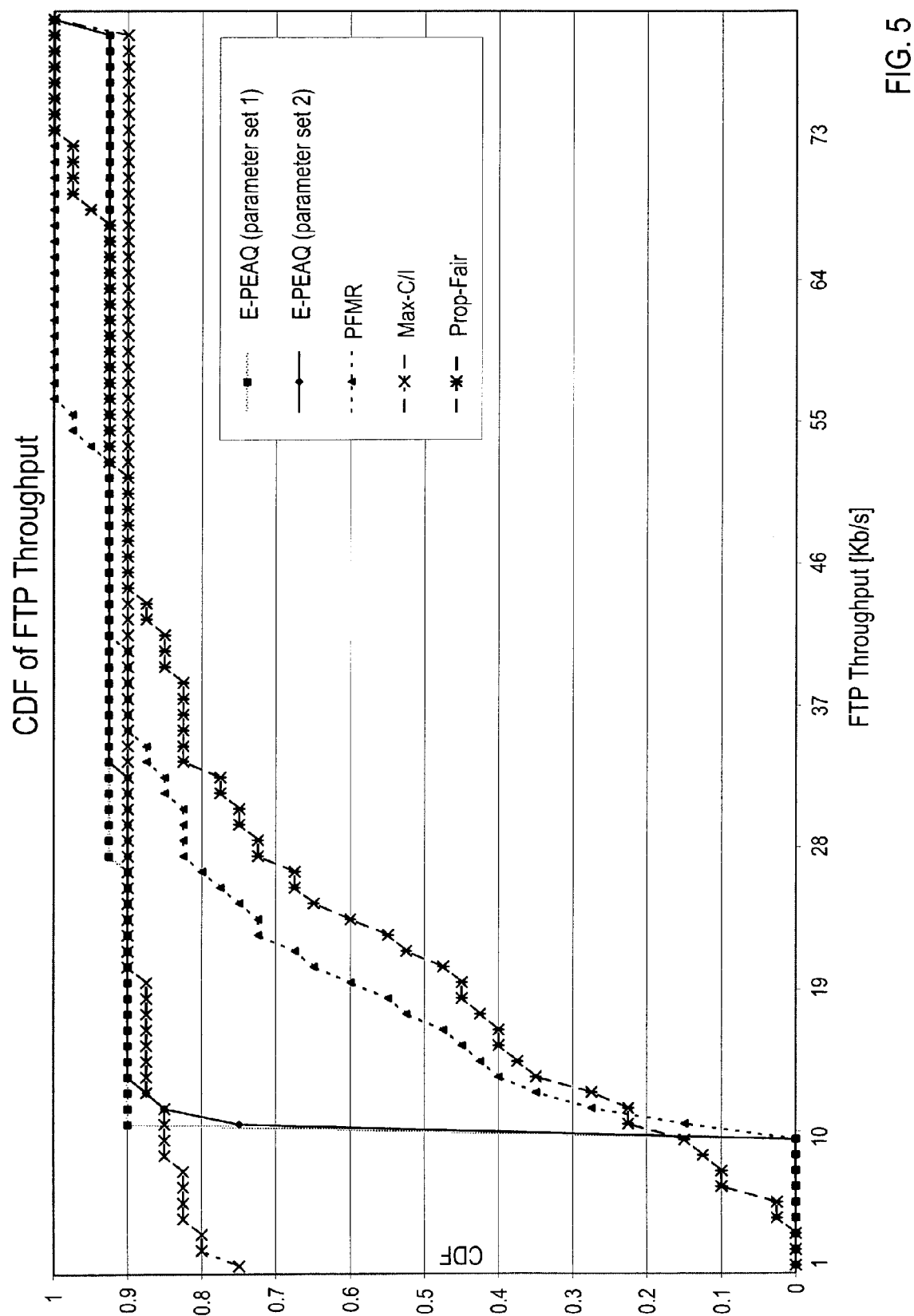
FIG. 5 is a graph illustrating a comparison of a Cumulative Distribution Function (CDF) of user perceived (FTP) throughput achieved by prior art scheduling algorithms and the scheduling method in accordance with the exemplary embodiments of the invention.

FIG. 5 is a graph illustrating a comparison of a Cumulative Distribution Function (CDF) of user perceived (FTP) throughput achieved by prior art scheduling algorithms and the scheduling method in accordance with the exemplary embodiments of the invention. IN FIG. 5, E-PEAQ (parameter set 1) provides minimum rates to all users and gives the excess to users with the best RF locations. This distribution of data rates can also be observed for E-PEAQ (parameter set 2). PFMR on the other hand, has the objective function of providing minimum rates and distributing the excess resources proportionally across different users. Due to this behavior, the aggregate system throughput is significantly lower (approximately, 33% lower throughput when compared with E-PEAQ (parameter set 1)). Max C/I has the worst performance in terms of user satisfaction. It can be noted that 75% of the users see throughputs of zero. The best users in the system get the most and hence the overall throughput is high. It is interesting to note that E-PEAQ (parameter set 1) provides better user satisfaction than Proportional Fair algorithm and yet achieves about 30% higher throughput.

Figure 6:
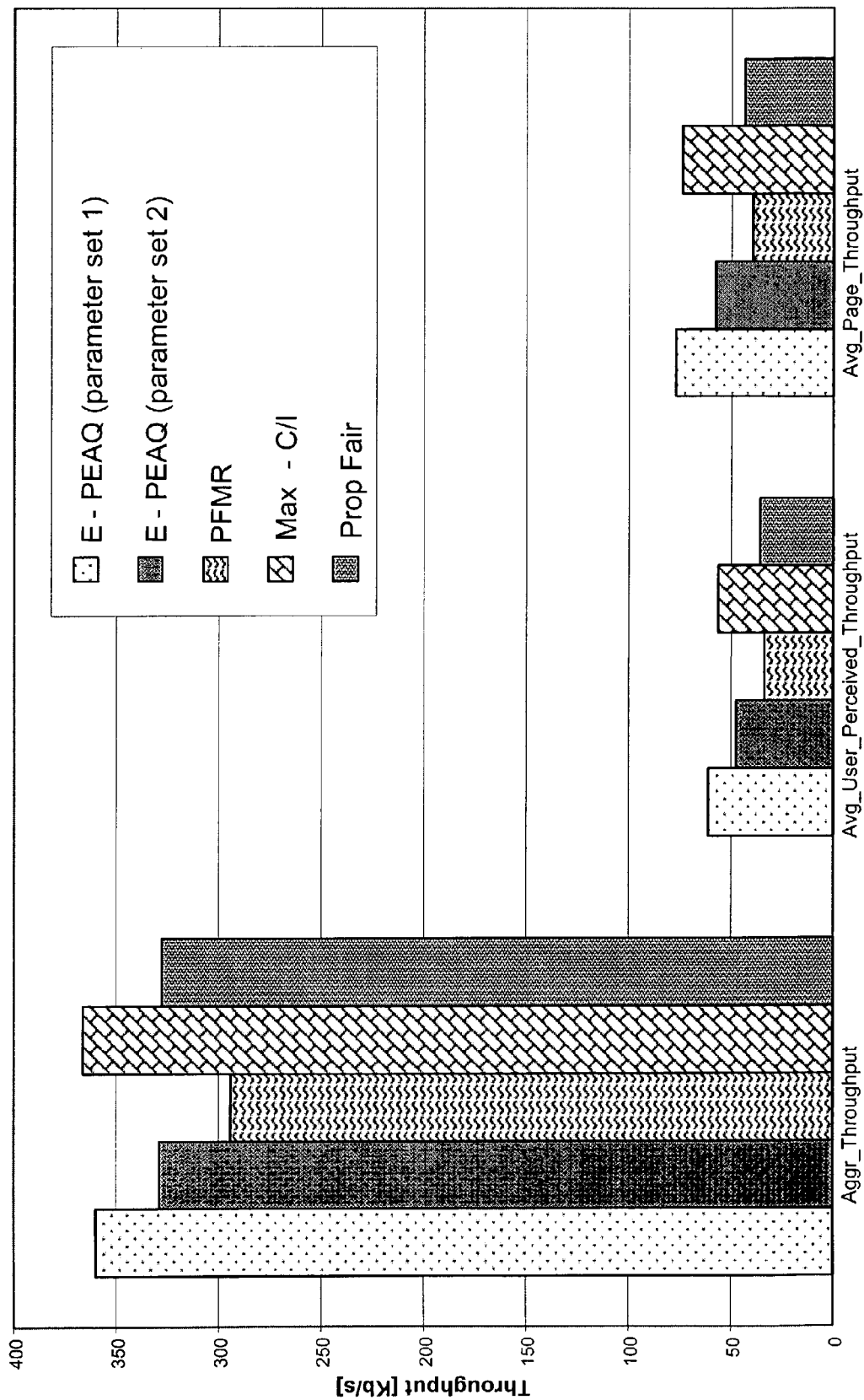
FIG. 6 is a graph illustrating a comparison of throughput metrics for web page transfer application layer protocol (HTTP) achieved by prior art scheduling algorithms and the scheduling method in accordance with the exemplary embodiments of the invention.

FIG. 6 is a graph illustrating a comparison of throughput metrics for web page transfer application layer protocol (HTTP) achieved by prior art scheduling algorithms and the scheduling method in accordance with the exemplary embodiments of the invention. IN FIG. 6, the aggregate system throughput, average user perceived throughput, and the average page throughput for E-PEAQ, Max C/I and PF/PFMR are illustrated.

Figure 7:
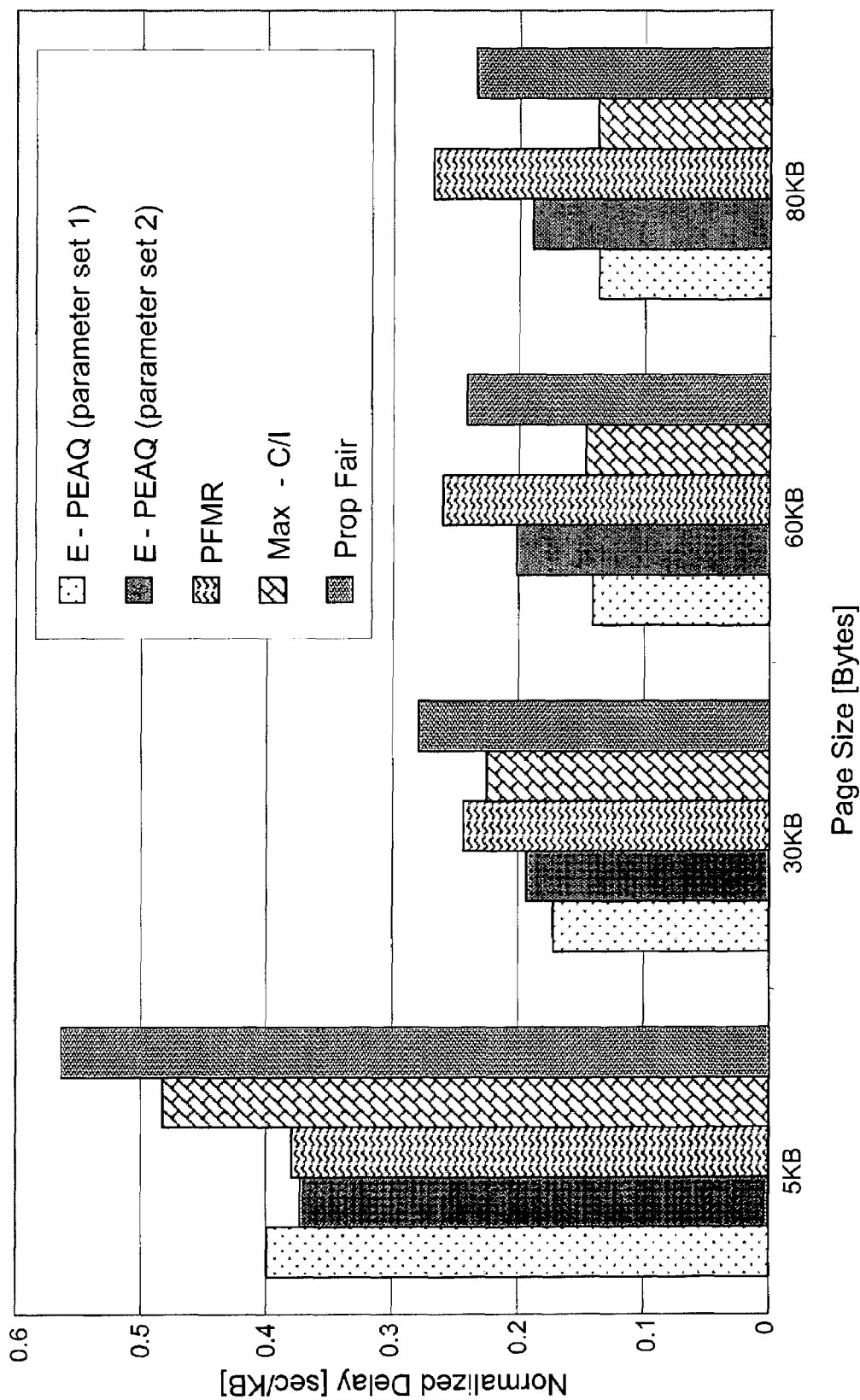
FIG. 7 is a graph illustrating a comparison of normalized delay performance of prior art scheduling algorithms and the scheduling method in accordance with the exemplary embodiments of the invention.

FIG. 7 is a graph illustrating a comparison of normalized delay performance of prior art scheduling algorithms and the scheduling method in accordance with the exemplary embodiments of the invention; and FIG. 8 is a graph illustrating a comparison of user perceived average page throughput achieved by prior art scheduling algorithms and the scheduling method in accordance with the exemplary embodiments of the invention.

These metrics were captured by selecting 20 users randomly from a 40 user trace (a30.dat). The same 20 users were chosen in all the three scheduling schemes. As in the FTP case, Max C/I achieves the highest aggregate system throughput. Note that E-PEAQ (parameter set 1) also achieves the aggregate system throughput, user perceived throughput and page throughput which are close to the Max C/I scheme.

The normalized delay performance is captured in FIG. 7. In general, the normalized delay decreases as the page size increases. This is to be expected since the request/response style of HTTP incurs fixed latencies that are independent of the page size. As the page size increases, this fixed delay component becomes smaller and smaller when compared with the total data transfer time. With respect to the scheduling schemes studied, E-PEAQ (parameter set 2) and PFMR have better normalized delay performance for the 5Kbyte pages, although E-PEAQ (parameter set 1) outperforms the other two schemes for page sizes larger than 5KB.

The CDF of user perceived throughputs are shown in FIG. 8. While the E-PEAQ and PFMR schedulers achieve the minimum rate of 9.6 Kb/s, the Proportional Fair and Max C/I scheduling schemes do not.

Accordingly, the exemplary embodiments of the present invention provide a scheduler and method for scheduling transmissions in a communication system so as to maximize user satisfaction by achieving QoS class-specific minimum throughput targets, while staying within QoS class-specific maximum throughputs to provide users with an incentive to upgrade service and potentially reduce sector activity. The scheduling method in accordance with the exemplary embodiments may provide perceptible differences to end users belonging to different QoS classes, and tangible benefits to network operators (i.e., higher system capacity, more predictable data transfers, increased revenue).

The exemplary embodiments of the present invention being thus described, it will be obvious that the same may be varied in many ways. For example, the exemplary embodiments of the present invention have specific applications to the scheduling of packet transmissions from a base station to mobile stations of a CDMA network, such as a CDMA network operating in accordance with the cdma2000 1× EV-DO standard. Accordingly, the exemplary embodiments described above may be implemented by a scheduler in such a network, and have been described in the context of a scheduler or scheduling function that is implemented by a base station controller.

However, the exemplary embodiments of the present invention are more general in range of applicability, as other useful applications are envisaged in communication networks of other kinds, including both wired and wireless networks. In particular, the exemplary embodiments are applicable not only for scheduling downlink transmissions, but also may be applicable for scheduling uplink transmissions in a CDMA system or other wireless network. Such variations as described above are not to be regarded as departure from the spirit and scope of the exemplary embodiments of the present invention, and all such modifications as would be obvious to one skilled in the art are intended to be included within the scope of the following claims.

We claim:

1. A method for scheduling transmissions to a plurality of users in a communication network, comprising:

assigning a first target minimum throughput for receiving a next transmission to at least one of the plurality of users based on a quality of service (QoS) class of the user, the first target minimum throughput being greater than a second target minimum throughput assigned to another of the plurality of users, and the quality of service class of the user being-specified by the network;

prioritizing the plurality of users for transmission in the communication network;

assigning, to the user, a data rate for receiving the next transmission based on the prioritizing step, the assigned data rate being between the first target minimum throughput and a target maximum throughput, the target maximum throughput being associated with the quality of service class of the first user; and downgrading a priority for scheduling the user if the average data rate reported by the user is less than the target minimum throughput.

2. The method of claim 1, wherein a QoS class of a user is represented by how much a user pays for a particular service offered by the communication network.

3. The method of claim 2, wherein said assigning further includes allocating residual airlink bandwidth to users that subscribe to a higher class of service.

4. The method of claim 3, wherein said allocating is performed based on the average user throughput of the user and the revenue generated for the network by carrying traffic for the user.

5. The method of claim 4, wherein said prioritizing further includes scheduling the users in order of the user having the highest total expected revenue per average user throughput in a given time instant to receive said residual airlink bandwidth, until there is no more data to transmit to the user.

6. The method of claim 1, wherein said assigning further includes:

determining, for each user in at least one timeslot, a token count that tracks the user's achieved performance relative to a target minimum throughput, determining a weight for each user based on one or more of the token count and a current rate requested by the user; and selecting a user with a highest weight as the user to be served the next transmission.

7. The method of claim 6, further comprising:

updating, at least once, the token count of one or more of the users.

8. The method of claim 7, wherein said updating a token count further includes incrementing or decrementing the token count based on a target minimum throughput ($R^i_{min}$) guaranteed by the network to an $i^{th}$ user.

9. The method of claim 8, wherein a current token count value for the $i^{th}$ user in an $n^{th}$ timeslot, ($T_i(n)$), is incremented or decremented in accordance with:

$$T_i(n)=T_i(n-1)+X_i(n)-b_i(n), \text{ with } X_i(n)=\alpha^i_{min}/600(\text{bits/slot});$$

where $X_i(n)$ is a token rate that represents a product of the target minimum throughput for user i and the timeslot duration, a is a tunable parameter that permits the token rate to be set at a value higher than the target minimum throughput for a given period, and $b_i(n)$ represents the number of bits transmitted to the user i in timeslot n.

10. The method of claim 6, further comprising:

restricting token counts for each user to a given range.

11. The method of claim 6, wherein said determining a weight function further includes determining, for an $i^{th}$ user in an $n^{th}$ timeslot, a weight function ($w_i(n)$) defined by:

$$w_i(n)=\max\{[DRC_i(n)]^{1+\delta} \cdot e^{\alpha T_i(n)}, DRC_i(n)\},$$

where $DRC_i(n)$ denotes the rate requested by the $i^{th}$ user in slot n, δ represents a rate request exponent, α denotes a tunable parameter and $T_i(n)$ denotes the current token count value for the $i^{th}$ user in slot n; and said selecting further includes selecting the user having the maximum positive-valued weight function ($w_i(n)$) to be served the next transmission in the $n^{th}$ timeslot.

12. The method of claim 1, further comprising periodically comparing the average data rate requested by a user to the user's target minimum throughput.

13. The method of claim 12, further comprising:

determining, for an $i^{th}$ user in an $n^{th}$ timeslot, a token rate that is based on the $i^{th}$ user's achieved performance relative to a target minimum throughput; and said downgrading further including temporarily setting the token rate so as to downgrade the $i^{th}$ user's priority for being scheduled to receive a next transmission, if said comparing indicates the average data rate requested by the $i^{th}$ user is less than the $i^{th}$ user's target minimum throughput.

14. A scheduler scheduling a plurality of users in a communication network to receive a transmission in accordance with the method of claim 1.

15. A method for scheduling transmissions to a plurality of users in a communication network, comprising:

determining, for an $i^{th}$ user in an $n^{th}$ timelslot, a token count that tracks a user's achieved performance relative to a target minimum throughput guaranteed by the network;

prioritizing the users based on one or more of the token count and a current rate requested by the user;

assigning a higher target minimum throughput for receiving a next transmission to the highest priority $i^{th}$ user.

16. The method of claim 15, wherein the token count is a measure of the $i^{th}$ user's dissatisfaction level at being served data by the network.

17. The method of claim 15, wherein the highest priority $i^{th}$ user is the user scheduled to receive the next transmission at said assigned higher target minimum throughput.

18. The method of claim 17, further comprising:

initializing a token count for a new user entering the network based on one of a specified interval spanning m timeslots arid the priority of the scheduled user currently receiving the next transmission.

19. The method of claim 18, said initializing further includes setting a token count so that the new user is served within said m slots, else scheduling the user with a priority that equals the currently served scheduled user.

20. The method of claim 17, wherein the scheduled user maintains a token pool of tokens, the method further comprising:

depleting the scheduled user's token pool by a number of tokens corresponding to the bits transmitted to the scheduled user in the $n^{th}$ slot.

21. The method of claim 20, wherein said depleting further includes updating, by an entire number of bits transmitted to the scheduled user at the start of the transmission, a rate at which the scheduled user's token pool is decremented in the $n^{th}$ slot.

22. The method of claim 20, wherein said depleting further includes updating, by an entire number of bits transmitted to the scheduled user at the end of the transmission, a rate at which the scheduled user's token pool is decremented in the $n^{th}$ slot.

23. The method of claim 20, wherein said depleting further includes:
- determining the number of bits transmitted to the scheduled user per slot at an expected rate;
- decrementing the token pool by a number of token corresponding to the determined number of bits transmitted in each slot until the transmission is complete; and
- decrementing the token pool by any remaining number of bits transmitted to the scheduled user at the end of the transmission.

24. The method of claim 15, wherein a current token count value for the $i^{th}$ user in an $n^{th}$ timeslot, ($T_i(n)$), is incremented or decremented in accordance with:

$$T_i(n)=T_i(n-1)+X_i(n)-b_i(n), \text{ with } X_i(n)=\alpha R_i^{min}/600 \text{(bits/slot)};$$

where $X_i(n)$ is a token rate that represents a product of the target minimum throughput $R_i^{min}$ for the $i^{th}$ user and the timeslot duration, $\alpha$ is a tunable parameter that permits the token rate to be set at a value higher than the target minimum throughput for a given period, and $b_i(n)$ represents the number of bits transmitted to the $i^{th}$ user in the $n^{th}$ timeslot.

25. The method of claim 24, wherein the token rate $X_i(n)$ is dependent on how much the $i^{th}$ user pays for a particular service offered by the network.

26. The method of claim 24, further comprising:
freezing the incrementing or decrementing of a current token count value for the $i^{th}$ user if one of a network-related or user-initiated delay causes an idle period.

27. The method of claim 15, further comprising:
restricting token counts for each user to a given range.

28. A scheduler scheduling a plurality of users in a communication network to receive a transmission in accordance with the method of claim 15.

29. A method for scheduling transmissions to a plurality of users in a communication network, comprising:
- determining, for each user in at least one timeslot, a token count that tracks the user's achieved performance relative to a target minimum throughput;
- determining a weight for each user based on one or more of the token count and a current rate requested by the user; and
- selecting a user with a highest weight function as the user to be served the next transmission.

30. A scheduler scheduling a plurality of users in a communication network to receive a transmission in accordance with the method of claim 29.

* * * * *